UNITED STATES PATENT OFFICE.

ALBERT BUSCH, OF BRUNSWICK, GERMANY, ASSIGNOR TO THE FIRM OF JOHANN A. WUELFING, OF BERLIN, GERMANY.

PROCESS OF MANUFACTURING LITHIUM ACETYLSALICYLATE.

1,129,953.  Specification of Letters Patent.  Patented Mar. 2, 1915.

No Drawing.  Application filed February 25, 1914.  Serial No. 820,886.

*To all whom it may concern:*

Be it known that I, ALBERT BUSCH, doctor of philosophy, chemist, a subject of the Duke of Brunswick, residing in Brunswick, in the Dukedom of Brunswick, Germany, have invented a new and useful Process of Manufacturing Lithium Acetylsalicylate, of which the following is a specification.

The manufacture of alkali salts of acetylsalicylic acid, which have certain advantages over the free acid, presents several difficulties, owing to the ease with which this acid is decomposed. According to English Patent specification No. 15517/1902 and German Patent specification No. 218467 or the corresponding English Patent specification No. 29439/1909, the general mode of producing these salts is to dissolve or suspend the acetylsalicylic acid in a suitable organic liquid and then add the equivalent proportion of alkali, in the first case caustic alkali in alcoholic solution, in the latter alkali carbonate. It is the object of these processes to obtain the alkali salts of the acetylsalicylic acid, which are formed, in solution in the added medium; the solution is then filtered or not, and the alkali salt separated from it by crystallization, or by adding a precipitant, such as ether. These processes have the serious disadvantage that in the first place they require a considerable quantity of a solvent and precipitant and secondly more or less of the acetylsalicylic acid is decomposed by the alkali according to the duration of action. For this reason the German Patent specification 218467 or the corresponding English Patent specification 29439/1909 prescribe immediate filtration of the solution obtained, and its precipitation with ether for separating the alkali salt as quickly as possible. On these grounds, therefore, the said processes are not very practicable. They require two different liquids, a solvent and a precipitant, both in large proportions, and these liquids are only with difficulty to be separated for recovering them. Moreover a part of the acetylsalicylic acid is decomposed.

According to the present invention any alkali salt, but especially the lithium salt of the acetylsalicylic acid can be made with use of a single organic liquid which is required only in a comparatively small proportion, when used on certain conditions, to be described below, no crystallization being necessary and the output coming up almost to the theoretical yield, as no loss and no decomposition of acetylsalicylic acid will occur.

I have found out that an intimate and dry mixture of equivalent parts by weight of acetylsalicylic acid and lithium carbonate can be easily converted into lithium acetylsalicylate by moistening the mixture with a small proportion of an alcohol or a ketone of the aliphatic series and kneading or stirring the mass, till a sample dissolves in water readily and without evolution of carbon dioxid. As alcohols methylalcohol and ethylalcohol, as ketones acetone and methylethylketone can be used for the purpose, either in an anhydrous state or containing small quantities of water. Instead of the pure organic liquids, mixtures in different proportions may be used as well for the purpose.

To obtain a quite neutral lithium salt of the acetylsalicylic acid, the organic solvent used for converting a mixture of equivalent parts by weight of acetylsalicylic acid and lithium carbonate into lithium acetylsalicylate has to act upon the mixture for a certain time. When the mixture is finished and worked up shortly after moistening it with the solvent used, the lithium salt will show an alkaline reaction owing to lithium carbonate, that has not yet been neutralized by reaction. On stirring the mass for some time, the alkaline reaction, however, will disappear and the product become quite neutral. The duration of time for complete conversion of the mixture depends on the quantity to be converted and upon the proportion of solvent used. The greater the quantity of mixture and the smaller the proportion of solvent used, the longer the time for conversion. The proportion of solvents may be varied within certain limits without altering the result.

The great advantages of this process over the known processes are, as stated, above, that in the new process comparatively small proportions of a single solvent are required for promoting reaction, that the output comes up to the theoretical yield and that decomposition of acetylsalicylic acid is prevented by the mild and protracted action of the alkali carbonate on the acid.

The following example illustrates the invention, but is in no way intended to limit it:—

Example: 360 parts by weight of finely ground and sifted acetylsalicylic acid and 74 parts by weight of lithium carbonate are intimately mixed in a dry state and moistened with 130 parts by weight of methylethylketone. The mixture is then kneaded well in a mixing machine, until a sample dissolves clearly in water without evolution of carbon dioxid. The lithium acetylsalicylate, thus produced, is pressed in a dry filter cloth, broken to small pieces and dried first in the open air, then at a low temperature.

Lithium acetylsalicylate is a white powder, easily soluble in water with neutral reaction. When ferric chlorid is added to the aqueous solution, a flesh colored precipitate is formed. On adding dilute hydrochloric acid to the concentrated aqueous solution, free acetylsalicylic acid is precipitated which may be identified by its melting point. (134–135 centigrades).

Instead of methylethylketone any other of the organic liquids, mentioned above, may be used in a similar proportion for promoting reaction in the above example.

For the purpose of this invention alcohols of the aliphatic series are equivalents of ketones of the aliphatic series.

Having now described my invention, and in what manner the same is to be performed, what I claim as new and desire to secure by Letters Patent is:

Process of manufacturing lithium acetylsalicylate consisting in mixing equivalent quantities of acetylsalicylic acid and lithium carbonate intimately and in a dry state and moistening the mixture with ketones of the aliphatic series, then kneading the mass well until a sample dissolves clearly in water without evolution of carbon dioxid and with neutral reaction, and removing the organic liquid and drying the product thus obtained at a low temperature.

In testimony whereof I have signed my name in the presence of two subscribing witnesses.

ALBERT BUSCH.

Witnesses:
ALICE BUSCH,
FRANZ AUSMEYER.